(12) United States Patent
Singh et al.

(10) Patent No.: US 11,755,767 B2
(45) Date of Patent: Sep. 12, 2023

(54) SYSTEMS AND METHODS OF MULTI-KEY ENCRYPTION FOR MULTI-TENANT DATABASE

(71) Applicant: Auction.com, LLC, Irvine, CA (US)

(72) Inventors: Ravindra Pratap Singh, Irvine, CA (US); Bin Xu, Cupertino, CA (US); Shuangli Cao, San Jose, CA (US)

(73) Assignee: Auction.com, LLC, Irvine, CA (US)

( * ) Notice: Subject to any disclaimer, the term of this patent is extended or adjusted under 35 U.S.C. 154(b) by 203 days.

(21) Appl. No.: 17/463,767

(22) Filed: Sep. 1, 2021

(65) Prior Publication Data

US 2022/0067193 A1 Mar. 3, 2022

Related U.S. Application Data

(60) Provisional application No. 63/073,665, filed on Sep. 2, 2020.

(51) Int. Cl.
| | |
|---|---|
| G06F 21/62 | (2013.01) |
| G06F 21/60 | (2013.01) |
| G06F 21/78 | (2013.01) |
| G06F 21/31 | (2013.01) |

(52) U.S. Cl.
CPC .......... G06F 21/6227 (2013.01); G06F 21/31 (2013.01); G06F 21/602 (2013.01); G06F 21/78 (2013.01); G06F 2221/0751 (2013.01)

(58) Field of Classification Search
CPC .... G06F 21/6227; G06F 21/31; G06F 21/602; G06F 21/78; G06F 2221/0751
See application file for complete search history.

(56) References Cited

U.S. PATENT DOCUMENTS

| | | | |
|---|---|---|---|
| 2014/0359282 A1* | 12/2014 | Shikfa | G06F 21/6227 713/165 |
| 2016/0232362 A1* | 8/2016 | Conway | G06F 16/90 |
| 2017/0026350 A1* | 1/2017 | Dawoud | H04L 63/067 |
| 2018/0165470 A1* | 6/2018 | Nachenberg | H04L 9/0897 |
| 2019/0147170 A1* | 5/2019 | Keselman | H04L 9/0869 713/189 |

\* cited by examiner

Primary Examiner — Ayoub Alata
(74) Attorney, Agent, or Firm — Fish IP Law, LLP

(57) ABSTRACT

A method for data isolation in a multi-tenant environment includes a vault API that is programmed to generate a key ID corresponding to a client ID associated with received entity data and pass an encryption request to a separate computer system that generates a data key to encrypt the entity data. The encrypted data is then returned to the vault API that then stores the encrypted data in a client collection associated with the client ID.

9 Claims, 6 Drawing Sheets

SYSTEMS AND METHODS OF MULTI-KEY ENCRYPTION FOR MULTI-TENANT DATABASE

This application claims priority to U.S. provisional application 63/073,665, filed Sep. 2, 2020. U.S. provisional application 63/073,665 and all other extrinsic references contained herein are incorporated by reference in their entirety.

FIELD OF THE INVENTION

The field of the invention is encryption technologies for systems employing multi-tenant database environments.

BACKGROUND

The background description includes information that may be useful in understanding the present invention. It is not an admission that any of the information provided herein is prior art or relevant to the presently claimed invention, or that any publication specifically or implicitly referenced is prior art.

Data security is a critical part of modern database solutions. Encrypting client data in data vaults has been a solution to keep data safe. However, searching encrypted client data is extremely performance-intensive and as such cumbersome.

Thus, there is still a need for a system of multi-key encryption in a multi-tenant database that provides separation and isolation of client data from the data of other entities, with granular encryption controls and the ability to efficiently search among encrypted data without the performance deterioration of existing solutions.

SUMMARY OF THE INVENTION

The inventive subject matter provides apparatus, systems and methods for data isolation in multi-tenant environments in which a vault API receives an encryption request that includes a client ID, an entity name, an entity ID and entity data to be encrypted. Based on the request, the vault API generates a key ID that corresponds to the client ID. The vault API the issues an encryption request to a cloud-based computer system that includes they generated key ID and the entity data that is to be encrypted. The cloud-based computer system generates a data key based on the key ID, and associates the data key with the entity data, and uses the data key to encrypt the entity data. The encrypted data is then sent back to the vault API, which stores the encrypted data and the key ID in a client collection associated with the client ID within a vault database.

In embodiments, the entity data includes real estate information. In these embodiments, the entity data can include a property ID, a loan number, and/or a reserve price.

In embodiments of the inventive subject matter, the encrypted data can include an identifier with a corresponding identifier value. In these embodiments, the client collection can include a plurality of encrypted data sets, each having their own corresponding identifier and identifier value.

In embodiments of the inventive subject matter, the client collection can be searched to find specific encrypted data. In these embodiments, the vault API receives a search request in the form of a query that includes an identifier value. The vault API then executes a matching operation to find whether there exists a match for the identifier value in the query. If there is a match, the vault API provides the encrypted data set whose identifier matched to the cloud-based computer system for decryption. The cloud-based computing system decrypts the encrypted data set using the data key corresponding to the encrypted data key and then a client-side module presents the decrypted data to a user.

In embodiments of the inventive subject matter, an encrypted data set can be updated. In these embodiments, the vault API receives an update to encrypted entity data. The vault API sends this update along with a key ID and the encrypted entity data set to the cloud-based computer system. The cloud-based computer system decrypts the encrypted entity data, applies the update, and then re-encrypts the updated entity data set. In embodiments of the inventive subject matter, the same key ID can continue to be used. In other embodiments, a new key ID is generated by one of the vault API or the cloud-based computing system to reflect the updated data set. The updated key ID would correspond to an updated data key associated with the updated entity data. The vault API then receives the updated encrypted entity data and stores it in the client collection.

Various objects, features, aspects and advantages of the inventive subject matter will become more apparent from the following detailed description of preferred embodiments, along with the accompanying drawing figures in which like numerals represent like components.

All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

The following description includes information that may be useful in understanding the present invention. It is not an admission that any of the information provided herein is prior art or relevant to the presently claimed invention, or that any publication specifically or implicitly referenced is prior art.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

DETAILED DESCRIPTION

It should be noted that any language directed to a computer or computer devices should be read to include any suitable combination of computing devices, including servers, interfaces, systems, databases, agents, peers, engines, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network.

Examples of suitable computing devices can include server computers, laptop computers, desktop computers, tablets, smartphones, or other devices capable of executing, via a processor, the instructions stored in non-transitory computer-readable media to carry out the various functions and processes of the inventive subject matter.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

Figure 1:
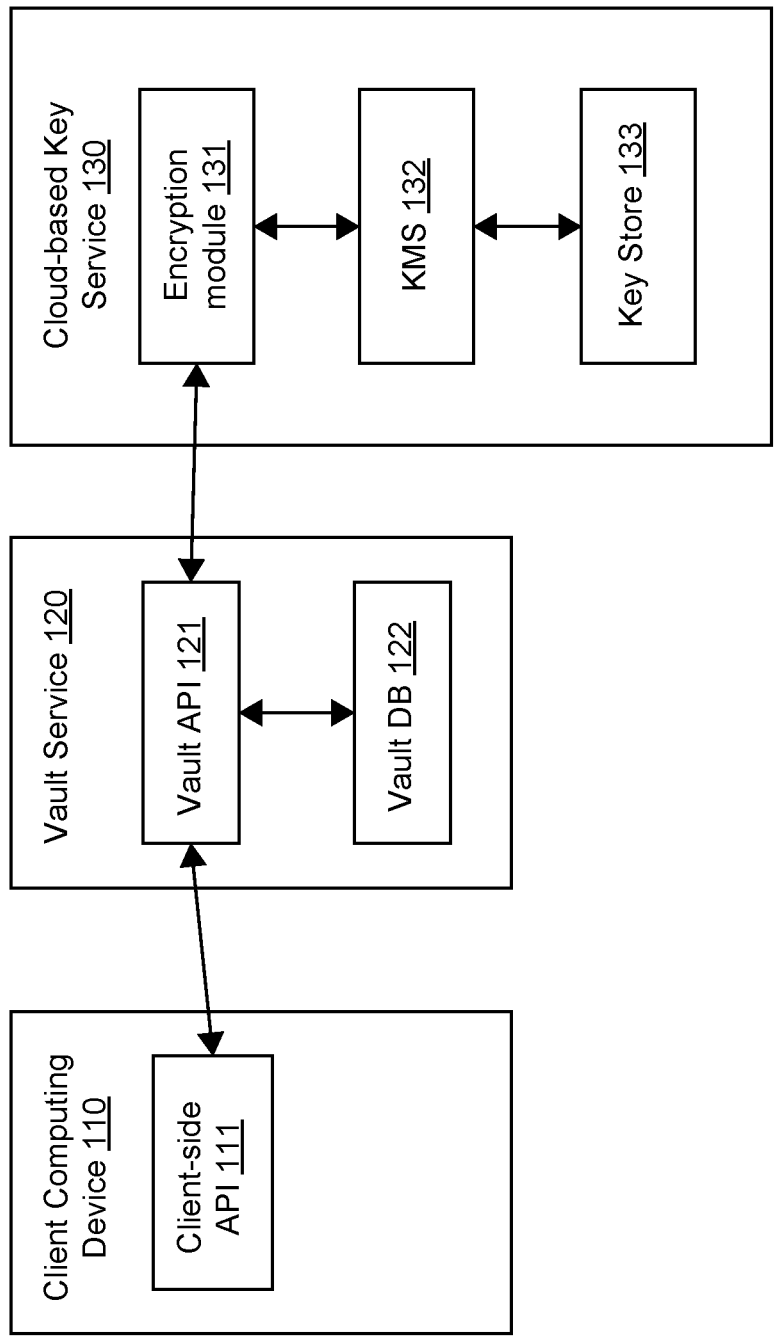
FIG. 1 is a diagrammatic overview of a system and its components, according to embodiments of the inventive subject matter.

FIG. 1 illustrates a diagrammatic overview of the system 100 according to embodiments of the inventive subject matter.

As seen in FIG. 1, the system 100 generally includes a client computing device 110, a vault service component 120 and a cloud-based key service component 130.

The client computing device 110 can include one or more hardware computing devices that include a processor, a memory and at least one data communication interface that enables it to exchange data with other computer systems. As seen in FIG. 1, client computing device 110 includes a client-side API 111 that is executed by the client computing device 110 to connect with other computing devices to execute the various system functions discussed herein.

As discussed in further detail below, the vault service 120 is responsible for storing the client-key association and encrypted entity data. The vault service 120 includes a vault API 121 that, when executed, is communicatively coupled with the client-side API 111 and with the encryption module 131 of cloud-based key services 130. The vault service 120 also includes a vault database 122 communicatively coupled with the vault API 121. The vault database 122 is used to store the client-key association and encrypted entity data after creation and until retrieval.

The vault service 120 can include one or more hardware computing devices that include a processor, a memory and at least one data communication interface that enables it to exchange data with other computer systems.

The cloud-based key service 130 is responsible for creating encryption keys, encrypting the entity data upon request and generating a key ID corresponding to they generated encryption key. The could-based key service 130 includes an encryption module 131, a key management system 132, and a key store 133. The encryption module 131 is communicatively coupled with the vault API 121 and with the key management system 132, and the key management system 132 is in turn communicatively coupled with the key store 133. The various functions of the encryption module 131, key management system 132, and key store 133 will be discussed in greater detail below.

The cloud-based key service 130 can include one or more hardware computing devices that include a processor, a memory and at least one data communication interface that enables it to exchange data with other computer systems. In embodiments such as the one discussed herein, suitable cloud-based platforms for the processes of cloud-based key service 130 can include Amazon Web Services ("AWS").

Figure 2:
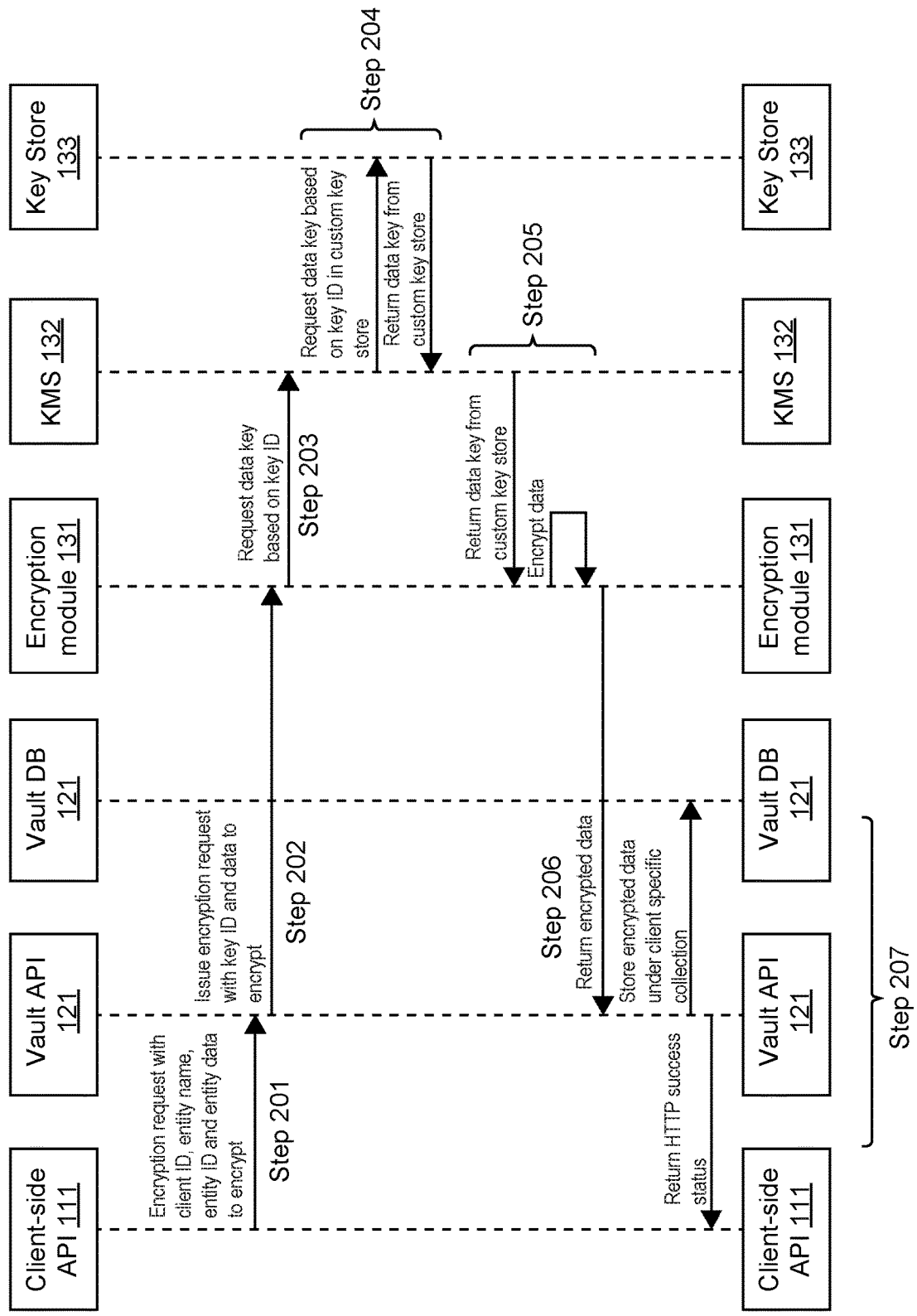
FIG. 2 is a flowchart of the processes according to embodiments of the inventive subject matter.

FIG. 2 provides an illustration of the processes according to embodiments of the inventive subject matter.

At step 201, the client-side API 111 transmits an encryption request with a client ID, an entity name, an entity ID and the entity data to be encrypted to the vault API 121. The client ID can be an alphanumeric identifier corresponding to a particular client. The entity ID can be an alphanumeric identifier corresponding to the entity identified by the entity name and associated with the entity data to be encrypted.

In embodiments such as the one discussed herein, the entity to which the entity data pertains can be a property and thus the entity data comprises property data corresponding to the property. Thus, in these embodiments of the inventive subject matter, the entity data that is provided by the client-side API 111 includes a property ID, a loan number, and a reserve price. The entity data can also include a client ID number. In further embodiments, the entity data can include a ZIP code, location information, or other data associated with the property.

At step 202, the vault API 121 generates a key ID and issues an encryption request with the key ID and the data to encrypt to the encryption module 131. They key ID can be an alphanumeric identifier that is to be associated with data keys that will be obtained from the key management system by the encryption module.

At step 203, the encryption module 131 requests the data key from the key management system 132 based on the key ID it received from the vault API 121. The key management system 132 then obtains the requested data key based on the key ID from the custom key store 133 at step 204. This is performed via a request from the key management system 132 to the custom key store 133. In response, the custom key store 133 generates the requested data key corresponding to the key ID and returns it to the key management system 132. In the embodiments discussed herein, the key store 133 is considered to be an AWS cloud hardware security module ("HSM").

At step 205, the encryption module 131 receives the data key from the custom key store 133 and encrypts the entity data. The encrypted entity data is then returned to the vault API 121 at step 206.

At step 207, the vault API 121 stores the encrypted entity data in a client or entity-specific collection of data within vault database 122. At this step, the vault API 121 can also return a success message to the client-side API 111 to notify the client of success. At this stage, the entity data persists in an encrypted state within the vault database 122, until it is required for report generation functionality.

The Vault Service 120 is responsible for storing the client-key association the vault database 122 only. In embodiments of the inventive subject matter, the actual key creation and deletion will be done inside AWS key management service ("KMS") console (e.g., the key management service 132 and the key store 133) by the designated custodian with AWS permission to create/delete keys. Vault service 120 does not perform any key manipulation inside the cloud-based key service 130. The vault service 120 is restricted to calling encrypt/decrypt services from AWS KMS. The objective is to limit the universe of designated roles with the authority to make changes to keys, ensuring keys remain securely managed.

Vault service 120 will be using an AWS credential with a minimal permission set required for encryption and decryption. A credential policy will be developed and implemented from the AWS IAM console.

Figure 3:
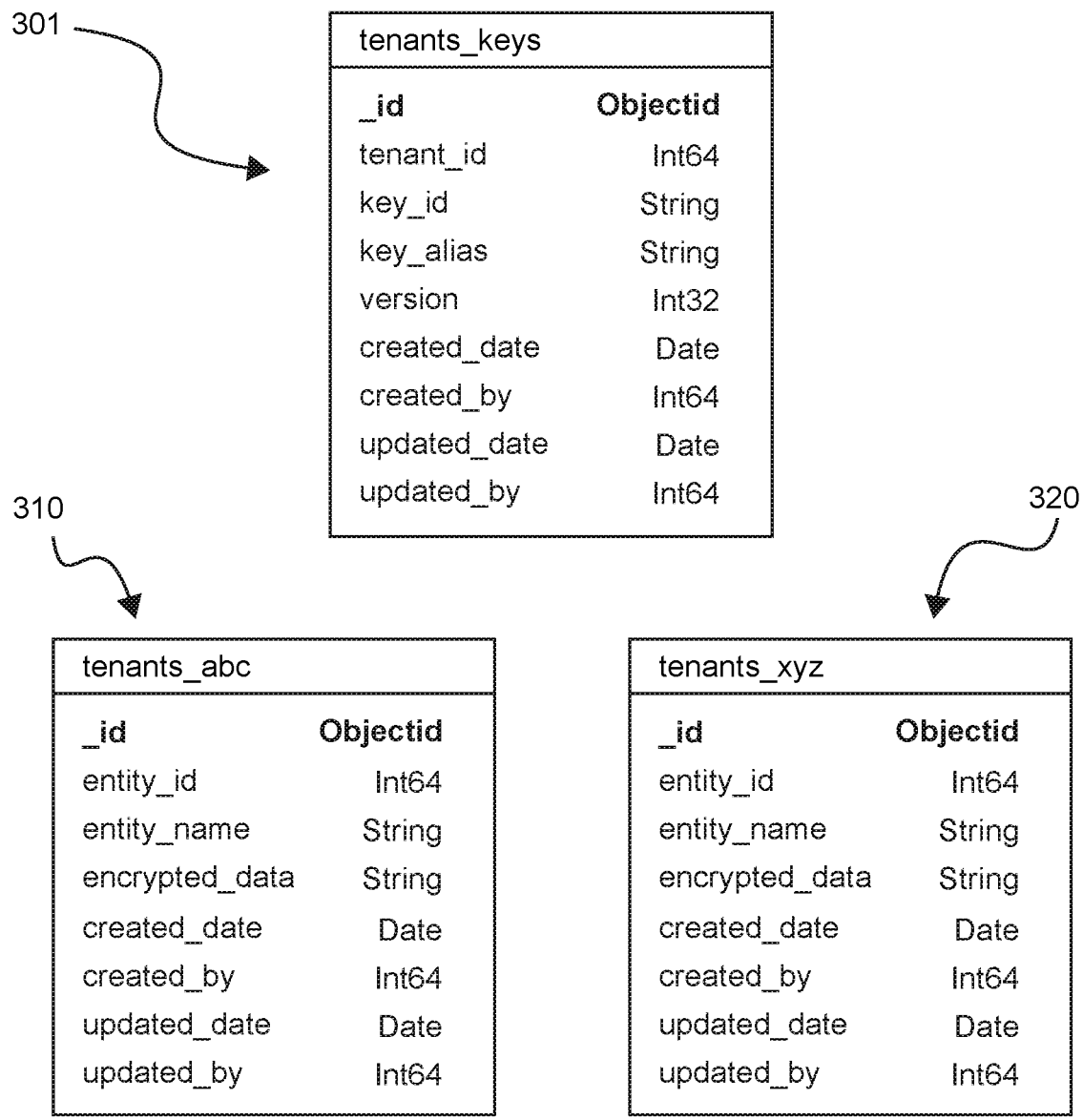
FIG. 3 is an illustrative example of a client collection within MongoDB, according to embodiments of the inventive subject matter.

In embodiments of the inventive subject matter, the vault service 120 uses MongoDB for storage. For example, Client ABC will have its own collection labelled "client_abc" within MongoDB, containing only the encrypted data for client ABC. Similarly, additional Clients such as Client XYZ would have their own data collection, following a similar labeling convention "client_xyz", facilitating an encryption 'silo' of data assets each unique to the individual Client. This method also enables ADC the ability to provide Clients data destruction in the cloud, through the destruction in the of uniquely assigned encryption keys. This example is illustrated in FIG. 3. In the example of FIG. 3, the client is called "tenant".

As seen in FIG. 3, a client ABC can have a collection 310 called "tenant_abc", and a client XYZ can have a collection 320 called "tenant_xyz". The database also stores a collection of client keys called "tenant_keys" 301 that correspond to the collections of each of the clients.

Figure 4:
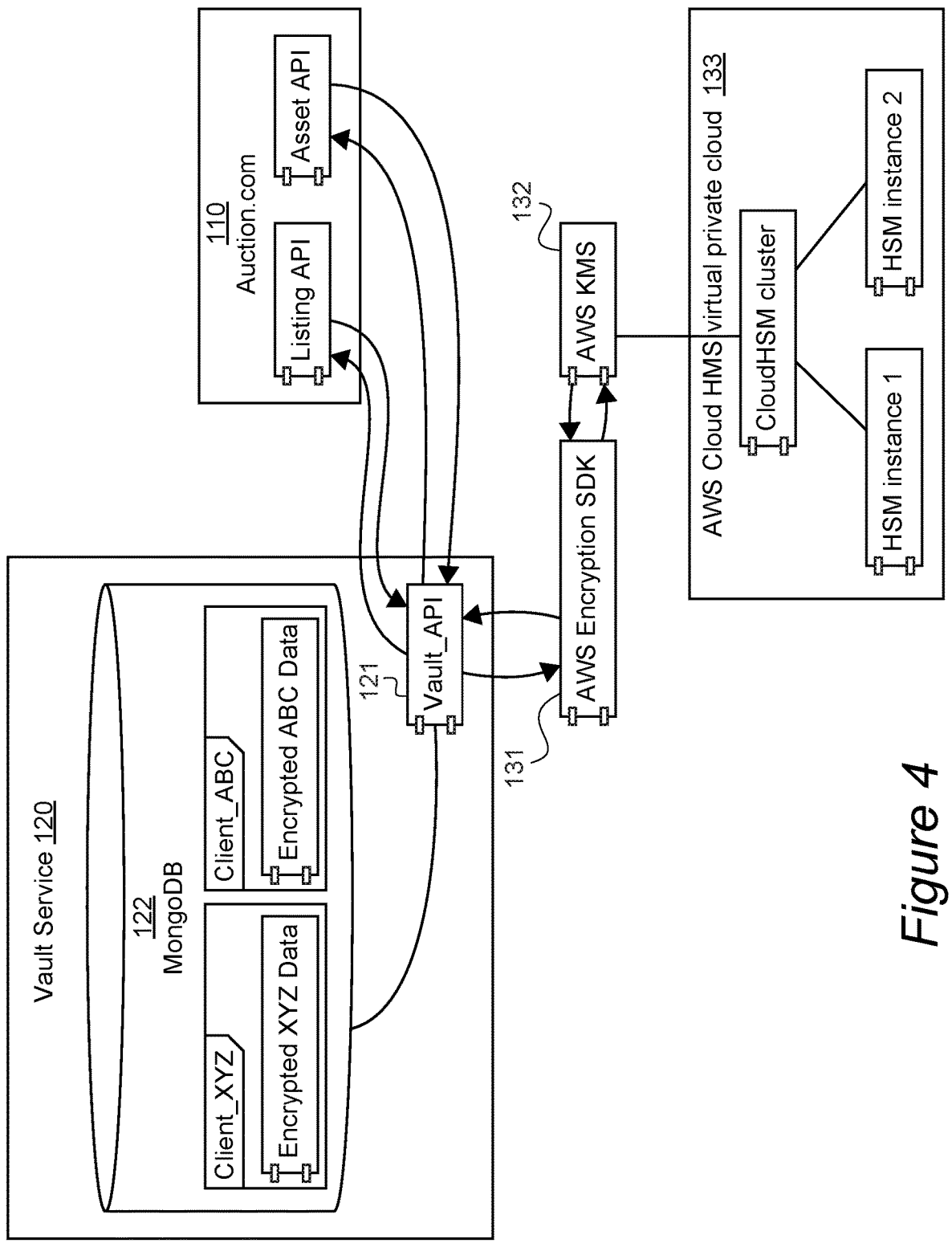
FIG. 4 another diagrammatic overview of the system of FIG. 1 after encrypted entity data sets have been created and with additional details.

FIG. 4 provides another diagrammatic overview of the system of FIG. 1 after encrypted entity data sets have been created and with additional details. The overview of FIG. 4 illustrates the vault database 122 of vault service 120 storing data collections that contain the encrypted entity data for each of clients XYZ and ABC.

Also seen in FIG. 4 is an embodiment of the inventive subject matter where the key store 133 is a hardware security module cluster with multiple instances used to generate the encryption keys.

Figure 5:
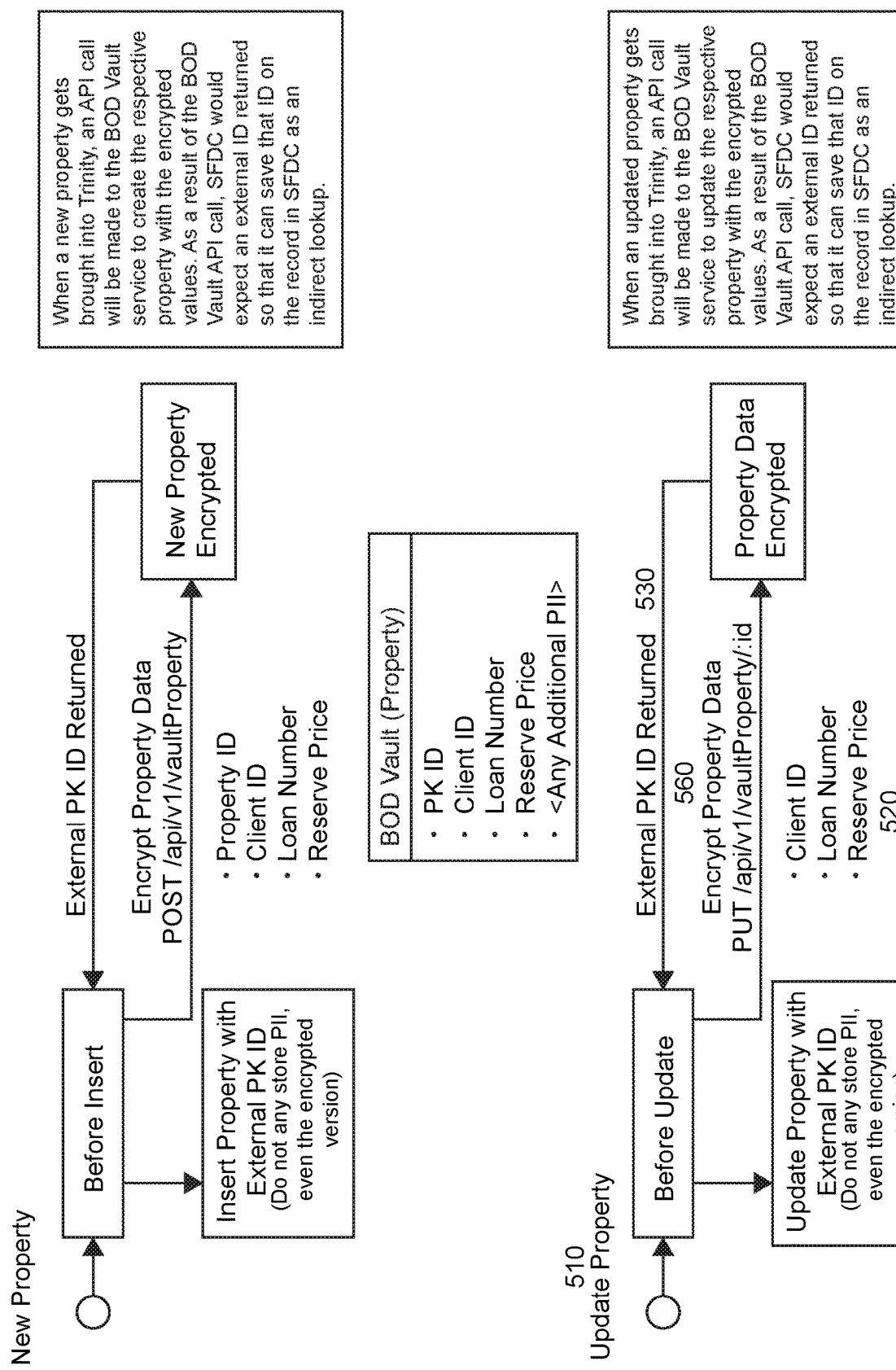
FIG. 5 provides an overview of the process of creating a new property entry within vault database and an overview of the process of updating the encrypted entity data already stored within the vault database.

FIG. 5 provides an overview of the process of creating a new property entry (i.e., encrypted entity data corresponding to a property as set forth in the process of FIG. 2) within vault database 122 and an overview of the process of updating the encrypted entity data already stored within the vault database 122.

The method of updating encrypted entity data as illustrated in FIG. 5 is as follows:

First, at step 510, the vault API 121 receives an update to entity data that is already storing in encrypted form. The update can be received from the client-side API 111.

The vault API 121 retrieves the encrypted entity data from the vault database 122 at step 520 and provides the encrypted entity data, the key ID, and the update to the encryption module 131 at step 530. The encryption module 131 obtains the data key corresponding to the key ID by requesting it from the key management system 132 which in turn obtains it from key store 133. The encryption module 131 then decrypts the encrypted entity data using the data key corresponding to the key ID at step 540.

The encryption module 131 then updates the entity data with the data from the received update at step 550 and re-encrypts the now-updated entity data using the data key at 560, and returns the encrypted updated entity data to the vault API 121 at step 570. In embodiments, the key ID can be updated if a new data key is generated for the encryption of the updated entity data.

The vault API 121 then stores the updated encrypted entity data back into the client collection within vault database 122 at step 580.

Figure 6:
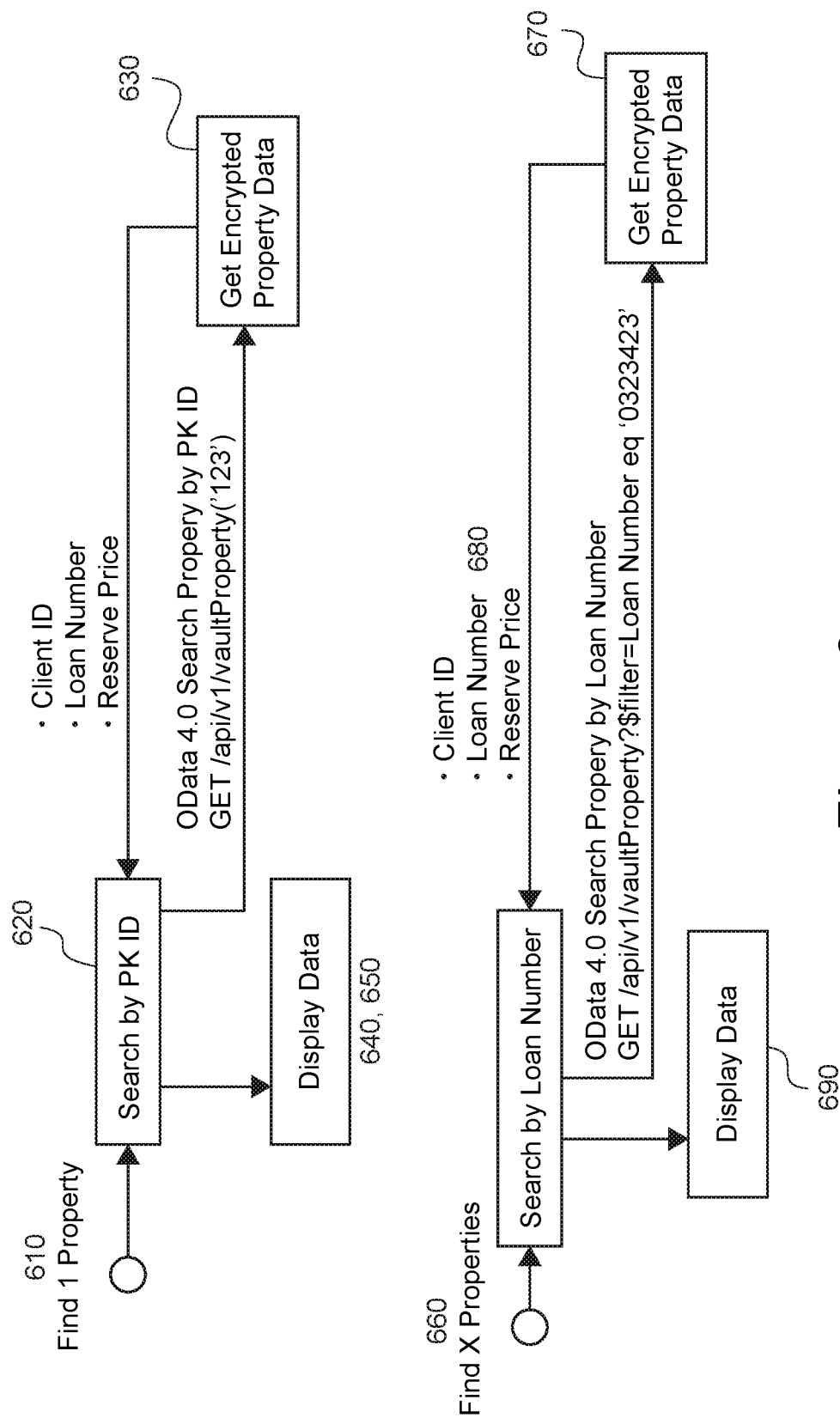
FIG. 6 provides diagrams of the processes of searching for a single property entity data set and for multiple property entity data sets.

FIG. 6 provides diagrams of the processes of searching for a single property entity data set and for multiple property entity data sets.

To find a single property, the system 100 receives a request to find a property at step 610. To find the property, the vault API 121 can search according to a key ID ("PK ID" in the figure) at step 620. Because each individual set of encrypted entity data includes a unique key ID, searching by key ID will return a single match of encrypted entity data. Upon receiving a match, the vault API 121 retrieves the encrypted entity data and provides it to the encryption module 131 for decryption at step 630. The encryption module 131 retrieves the key corresponding to the key ID and decrypts the data at step 640. The decrypted data is then returned to the client API for report generation at step 650.

To find multiple properties, a search can be conducted by a loan ID number or other identifier that is common to multiple encrypted entity data sets. Thus, the system 100 receives the request including a loan ID at step 660. When a loan ID number is submitted, all the encrypted entity data sets having that loan ID number are returned at step 670. The encryption module 131 then retrieves the keys corresponding to each of the key ID numbers of the returned encrypted entity data sets at step 680 and performs decryption accordingly and returns all of the decrypted data to the client API for report generation at step 690.

By using the methods of the inventive subject matter, specific entity data sets can be searched for and located without having to decrypt all of the data sets in a given collection. This also allows for searching across client data collections if encrypted entity data sets across different client collections share a common identifier.

In some embodiments, the loan ID number or other identifier that is to be searchable that is a part of a stored entity data set is not encrypted along with the rest of the entity data.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A method for data isolation in multi-tenant environments, comprising:
    receiving, by a vault API, an encryption request comprising a client ID associated with a client, an entity name, an entity ID and entity data;
    generating, by the vault API, a key ID corresponding to the client ID;
    issuing, by the vault API and to a cloud-based computer system, an encryption request comprising the generated key ID and the entity data;
    generating, by the cloud-based computer system, a data key based on the key ID, wherein the data key is associated with the entity data;
    encrypting, by the cloud-based computer system, the entity data by using the data key;
    transmitting, by the cloud-based computer system and to the vault API, the encrypted data; and
    storing, by the vault API, the encrypted data and key ID in a client collection within a vault database, wherein the client collection is associated with the client ID.

2. The method of claim 1, wherein the entity data includes a property ID, a loan number, and a reserve price.

3. The method of claim 1, wherein the encrypted data includes an identifier having an identifier value and the client collection includes a plurality of encrypted data sets, each of the plurality of encrypted data sets includes a respective identifier having a corresponding identifier value.

4. The method of claim 3, wherein the vault database further comprises a plurality of client collections associated with a plurality of clients, the method further comprising:
    receiving, by the vault API, a search request comprising a query, the query including an identifier;
    obtaining, by the vault API, an additional plurality of encrypted data sets from the plurality of client collections corresponding to the query according to a match of the query identifier with the identifier value of each of the plurality of encrypted data sets;
    providing, by the vault API to the cloud-based computer system, the encrypted data sets and key IDs corresponding to the encrypted data sets;
    decrypting, by the cloud-based computer system, the obtained additional plurality of encrypted data sets using a respective data key of each of the additional obtained plurality of encrypted data sets based on the key IDs; and
    presenting, by a client-side module, the decrypted plurality of data sets.

5. The method of claim 4, wherein the search request further includes a universal ID number.

6. The method of claim 1, further comprising:
    receiving, by the vault API, an update to the entity data;
    providing, by the vault API and to the cloud-based computer system, the encrypted entity data, the key ID, and the update;
    decrypting, by the cloud-based computer system, the encrypted entity data using the data key corresponding to the key ID;
    updating, by the cloud-based computer system, the entity data according to the received update;
    encrypting, by the cloud-based computer system, the updated entity data;
    returning, by the cloud-based computer system to the vault API, the encrypted updated entity data and an updated key ID corresponding to an updated data key associated with the updated entity data; and
    storing, by the vault API, the encrypted updated entity data and updated key ID in the client collection.

7. The method of claim 1, wherein the could-based computer system further comprises an encryption module, a key manager module, and a custom key store module.

8. The method of claim 1, wherein the entity data comprises data regarding a property.

9. A system for data isolation in multi-tenant database computing device environments, comprising:
- an online data vault system comprising a processor, a memory and a data communication interface, the online data vault system storing a plurality of client collections corresponding to a plurality of clients, wherein each of the client collections including a plurality of encrypted entity data sets, the online data vault system programmed to:
- receive a search request comprising a query that includes an identifier;
- retrieve a subset of the plurality of encrypted data sets from the plurality of client collections, the subset including encrypted data sets corresponding to the query that match the identifier;
- provide the subset of the plurality of encrypted data sets and a plurality of key IDs corresponding to the encrypted data sets to a cloud-based computer system; wherein
- the cloud-based computer system comprising a second processor, a second memory, and a second data communication interface, programmed to:
- receive from the online data vault system, the subset of the encrypted data sets and the corresponding key IDs;
- decrypt the received subset of encrypted data sets using respective data key of each of the received encrypted data sets based on the plurality of key IDs;
- provide the decrypted subset of the data sets to the online data vault system; wherein the online data vault system programmed to:
- receive the decrypted subset of the data sets from the cloud-based computer system; and
- cause a client-side module to present the decrypted subset of data sets to a user.

\* \* \* \* \*